US009114650B2

(12) United States Patent

Raz et al.

(10) Patent No.: US 9,114,650 B2

(45) Date of Patent: Aug. 25, 2015

(54) DIAGNOSING PRINTER MALFUNCTION FROM MALFUNCTION-RELATED INPUT

(75) Inventors: Shaul Raz, Shimshit (IL); Hila Nachlieli, Haifa (IL); Zachi Karni, Givat Ella (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 13/555,634

(22) Filed: Jul. 23, 2012

(65) Prior Publication Data

US 2014/0022574 A1 Jan. 23, 2014

(51) Int. Cl.

*G06F 3/12* (2006.01)
*G06K 15/00* (2006.01)
*B41J 29/393* (2006.01)

(52) U.S. Cl.

CPC ........ *B41J 29/393* (2013.01); *B41J 2029/3935* (2013.01)

(58) Field of Classification Search

None

See application file for complete search history.

(56) References Cited

U.S. PATENT DOCUMENTS

| | | | | |
|---|---|---|---|---|
| 8,150,106 | B2 | 4/2012 | Wu et al. | |
| 2006/0110009 | A1 * | 5/2006 | Klassen et al. | 382/112 |
| 2008/0137914 | A1 * | 6/2008 | Minhas | 382/112 |
| 2009/0274342 | A1 * | 11/2009 | Wu et al. | 382/112 |

* cited by examiner

*Primary Examiner* — Marcus T Riley

(57) ABSTRACT

A malfunction diagnosis system of a printer is provided. A printer controller receives malfunction-related input by the user from an input device, which user input specifies a print defect perceptible to the user. It generates image data representing a test print job in response to the user input specifying the perceptible print defect, and forwards the test print job image data to the printing unit to produce a corresponding test printout. Measurement data output from a sensing device as measured on the test printout is received and analyzed, and information indicative of a cause for the print defect based on the analyzed measurement data output from the sensing device is output.

20 Claims, 3 Drawing Sheets

DIAGNOSING PRINTER MALFUNCTION FROM MALFUNCTION-RELATED INPUT

SUMMARY OF THE INVENTION

Examples of the present invention provide a printer with a malfunction diagnosis system. In one example a printer comprises a printing unit arranged to produce a printout from image-representing data, an input device arranged to receive printer-operation-related input from a user, an output device arranged to provide printer-operation-related information for the user, a printer controller arranged to control operation of the printer in response to input commands by the user from the input device and to forward the image-representing data to the printing unit and to output the printer-operation-related information for the user at the output device, and at least one sensing device arranged to perform measurements on the printout produced from the printing unit and to output corresponding measurement data to the printer controller. The printer controller further is configured to receive malfunction-related input by the user from the input device, which user input specifies a print defect perceptible to the user, to generate image data representing a test print job in response to the user input specifying the perceptible print defect, and to forward the test print job image data to the printing unit to produce a corresponding test printout, to receive and analyze the measurement data output from the sensing device as measured on the test printout, and to output information indicative of a cause for the print defect based on the analyzed measurement data output from the sensing device.

In one example a method is also provided of malfunction-diagnosis in a printer. The printer comprises a printing unit arranged to produce a printout from image-representing data, an input device arranged to receive printer-operation-related input from a user, an output device arranged to provide printer-operation-related information for the user, a printer controller arranged to control operation of the printer in response to input commands by the user from the input device and to forward the image-representing data to the printing unit and to output the printer-operation-related information for the user at the output device, and at least one sensing device arranged to perform measurements on the printout produced by the printing unit and to output corresponding measurement data to the printer controller. The method of malfunction-diagnosis comprises receiving, by the printer controller, malfunction-related input by the user from the input device, which user input specifies a print defect perceptible to the user, generating, by the printer controller, image data representing a test print job in response to the user input specifying the perceptible print defect, and forwarding the test print job image data to the printing unit to produce a corresponding test printout, receiving and analyzing, by the printer controller, the measurement data output from the sensing device as measured on the test printout, and outputting information indicative of a cause for the print defect based on an analysis of the measurement data output from the sensing device.

BRIEF DESCRIPTION OF THE DRAWINGS

Examples of the present invention will now be described, by way of example only, with reference to the accompanying drawings in which corresponding reference numerals indicate corresponding items and in which.

The drawings and the description of the drawings are of examples of the invention and not of the invention itself.

DETAILED DESCRIPTION OF EMBODIMENTS

Figure 1:
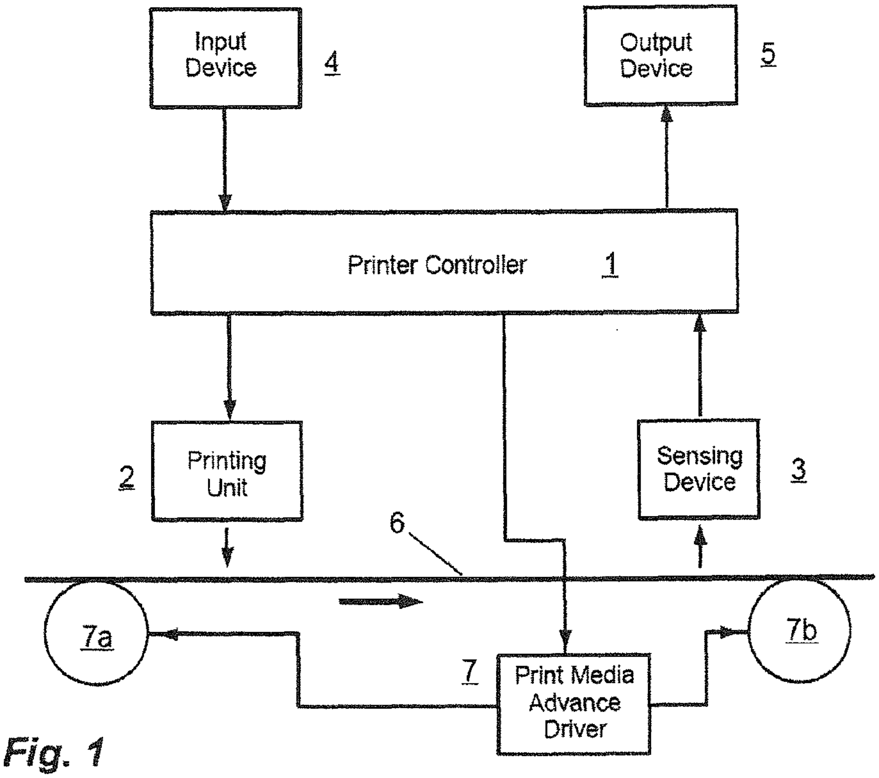
FIG. 1 shows a schematic diagram of a printer with a malfunction diagnosis system of an example.

FIG. 1 illustrates a simplified schematic diagram of a printer with a malfunction diagnosis system that is able to combine subjective print-quality sensitivities perceptible to a user and an automatic evaluation of objective machine state conditions. The printer includes a printing unit 2 and a printer controller 1 wherein the printing unit 2 is arranged to produce a printout from image-representing data on a print media 6. The image-representing data are forwarded from the printer controller 1 to the printing unit 2 in correspondence with a print job to be carried out by the printer. The printing unit may be of any suitable kind, it may be an inkjet printing unit, a laser printing unit or any other type of suitable printing unit. The printer may be a wide format printer. The print media 6 may be of any suitable kind as known in the art.

The print media 6 is transported relative to the printing unit 2 by a print media advance device 7, 7*a*, 7*b* which is exemplified in FIG. 1 by a print media advance driver 7 and print media advance rolls 7*a*, 7*b*. It is noted that the print media advance device schematically shown in FIG. 1 is for illustrative purposes only and can be embodied in any suitable way. The print media advance driver 7 is coupled to the printer controller 1 so as to receive appropriate print media advance driving signals in correspondence with the print job to be carried out by the printer.

The printer shown in FIG. 1 further includes an input device 4 which is arranged to receive printer-operation-related input from a user, and also an output device 5 which is arranged to provide printer-operation-related information for the user. The input device 4 and the output device 5 are coupled to the printer controller 1 so that respective input and output signals can be communicated between the printer controller 1 and the input device 4 and the output device 5, respectively.

The input device 4 may be of any suitable type, e.g. it may be an input panel including a number of keys for direct manual input of the printer-operation-related input from the user, or it may be an interface which is coupled to a data processing environment or network.

In a similar way, the output device 5 may be any suitable kind of output device, e.g. it may be a display for the direct outputting of printer-operation-related information to the user, or it may be an interface which is coupled to a data processing environment or network, as may be the case for the input device 4.

The printer controller 1 is arranged to control operation of the printer in response to commands by the user from the input device 4, which may be input directly or via a data processing environment or network, and the printer controller 1 is arranged to output the printer-operation-related information for the user at the output device 5, directly or via said data processing environment or network.

Figure 1A:
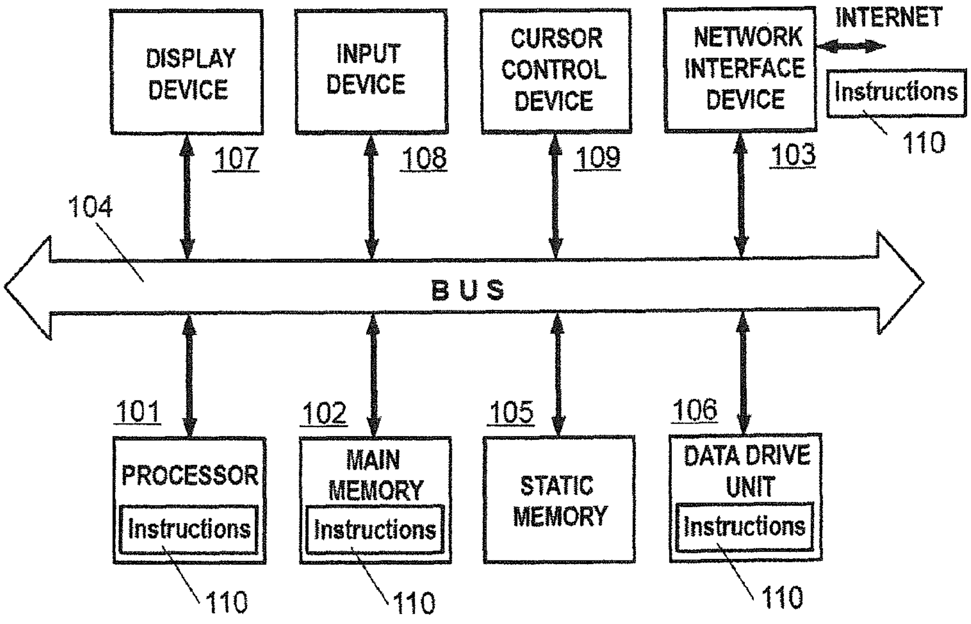
FIG. 1*a* is a diagrammatic representation of a computer system as it may be arranged to provide the functionality of a controller implemented in the printer.

FIG. 1*a* is a diagrammatic representation of a computer system as it may be arranged to provide the functionality of the controller 1 in FIG. 1. The computer system is configured to execute a set of instructions so that the controller 1 is able to perform the described tasks for the printer. The computer system includes a processor 101 and a main memory 102, which communicate with each other via a bus 104. Optionally, the computer system may further include a static memory 105 and/or a non-transitory memory in the form of a data drive unit 106 which may be e.g. a solid state memory or a magnetic or optical disk-drive unit. A video display 107 which is part of the computer system may form the output device 5 of FIG. 1, and an alpha-numeric input device 108 and a cursor control device 109 may form the user input device 4 of FIG. 1. Additionally, a network interface device 103 can be provided to connect the computer system to an Intranet or to the Internet which form the above said data processing environment or network.

A set of instructions (i.e. software) 110 embodying any one, or all, of the malfunction diagnosis system and the controller tasks, may reside completely, or at least partially, in or on a machine-readable medium, e.g. the main memory 102 and/or the processor 101. A machine-readable medium on which the software 110 resides may also be a data carrier (e.g. a solid state memory or data drive, a non-removable magnetic hard disk or an optical or a magnetic removable disk) which is part of the data drive unit 106. The software 110 may also be transmitted or received as a propagated signal via the intranet or the Internet through the network interface device 103, which also can be used for updating the software or for other purposes.

Referring back to FIG. 1, as already stated above, the printer controller 1 is arranged to forward the image-representing data to the printing unit 2 in correspondence with the print job to be carried out by the printer, wherein a number of parameters involved in the print job can be set by the user as a part of the printer-operation-related input. A representation of these parameters, or at least a part thereof, is provided to the user by the output device 5 in the form of printer operation related information.

The printer exemplified in FIG. 1 further includes at least one sensing device 3 to perform measurements on the printout which is produced from the printing unit 2 on the print media 6. The sensing device 3 outputs corresponding measurement data to the printer controller 1, and these measurement data include information representing the state or condition of the printout including print defects in the printout.

The at least one sensing device 3 may be of any suitable type, it may be a scanner, especially an inline scanner, or a spectrometer, or a combination of two or more sensing devices like this.

The printer controller 1 is configured to receive, in general, malfunction-related input from the user from the input device 4, which user input specifies a print defect that is perceptible to the user. Such print defects which are perceptible to the user, for example, may be fine bands which appear due to a miscalibration of one or more machine components, it may be low contrast stains that exist on a print due to a defective state or condition of one or more machine components, or it may be another type of print defect which is perceptible to the user.

The printer controller 1 is configured to generate, in response to the user input specifying the perceptible print defect, special image data representing a dedicated test print job, and to forward the image data representing the test print job to the printing unit 2 for producing a corresponding test printout on the print media 6.

The printer controller 1 further is configured to receive and analyze measurement data which are output from the sensing device 3 (these measurement data are based on the test printout produced by the printing unit 2 from the test print job image data) and to output information indicative of a cause for the print defect which information is based on the analyzed measurement data from the sensing device 3.

Correspondingly, the printer exemplified in FIG. 1 combines subjective print quality sensitivities perceptible to the user and an automatic evaluation of objective machine state or conditions so that, as it shall be called here, an integrated expert system for classification and identification and correction of print defects is provided. The system balances between subjective sensitivities for print quality and an evaluation of objective machine state or conditions which may result in visible, i.e. perceptible print quality defects.

For example, fine bands may appear due to a miscalibration of one or more machine components, while low contrast stains may exist on the same print or on another print due to the state of one or more other components. It should be noted that different markets have different needs and hence, may have different sensitivities to the same defects, e.g. marketing collateral customers may be more sensitive to low contrast stains and less to fine bands. On the other hand, photo album customers may be more sensitive to fine bands, and direct mail customers may accept all these prints as valid. The possibility to balance this enables the printer or press operator to focus better on the main cause of the print quality defect alone, and therefore save consumables and increase efficiency.

To achieve this balance, an interactive expert system is combined with an automatic analysis of one or more dedicated test print jobs. The expert system is adapted to guide the user in classifying the print defect or artefact according to his subjective sensitivities. The at least one sensing device 3 which is utilised, in combination with the functionalities of the printer controller 1, enable automatic procedures for detecting print defects or artefacts caused by an objective machine state or condition. The benefits of the described printer malfunction diagnosis system include better control of print quality and better and more efficient use of consumables.

Figure 2:
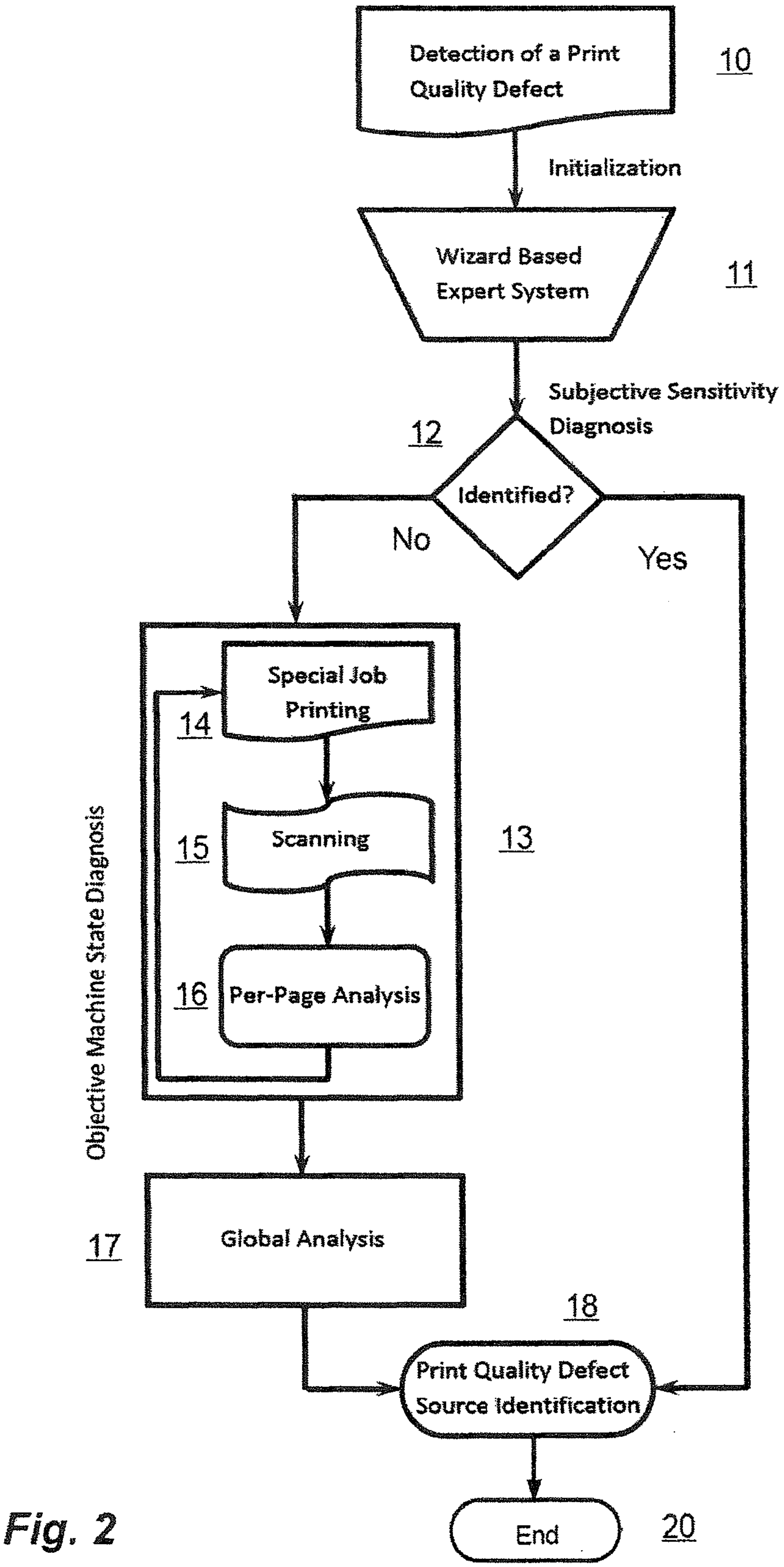
FIG. 2 shows a block diagram of a printer malfunction diagnosis as it is carried out in a printer of an example.
Figure 3:
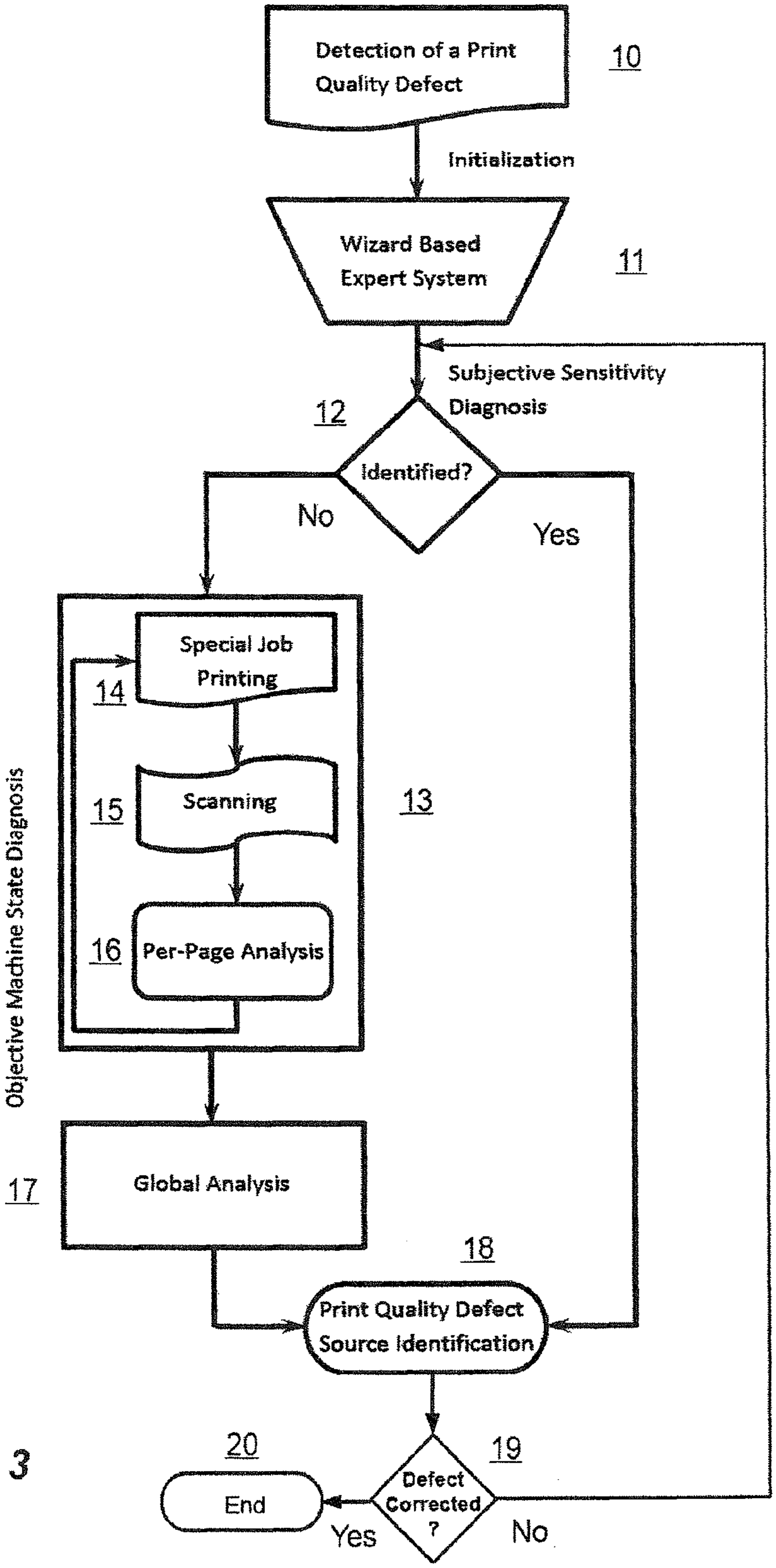
FIG. 3 shows a block diagram of a printer malfunction diagnosis as it is carried out in a printer of another example.

FIGS. 2 and 3 show block diagrams of a process in which the malfunction diagnosis is carried out by the printer controller in response to a malfunction-related input by the user which specifies a print defect perceptible to the user. In FIGS. 2 and 3, corresponding reference signs indicate corresponding items or activities in the malfunction diagnosis process.

At 10, a detection of a print quality defect initialises the malfunction diagnosis process 11, which here is called a "wizard based expert system". The detection of the print quality defect at 10 by the user results in a malfunction-related input to the input device 4 of FIG. 1, which causes initialisation of the wizard based expert system at 11. After initialization, at 12 a subjective sensitivity diagnosis results in a question whether the print quality defect is identified or not. This decision is based on a dialogue with the user via output device 5 and input device 4.

In the event that at 12 the answer is "Yes", the result is a direct print-quality-defect-source identification at 18 so that the process comes to an end at 20. That is to say, if the print quality defect source is identified at 12, the defect can be corrected directly.

However, if at 12 the print quality defect source is not identified, i.e. the answer is "No", an automated detection process 13 is started in which a special test print job is carried out at 14. In this test print job image data are generated by the printer controller 1 of FIG. 1 and are forwarded to the printing unit 2 to produce a corresponding test printout on the print media 6. At 15, the test printout on the media 6 is scanned or sensed by the at least one sensing device 3 of FIG. 1, and the resulting measurement data are analyzed, at 16, in a per-page analysis.

If the print quality defect source cannot be clearly identified at 12, i.e. the answer is not "Yes", the input by the user to the input device 4 may include a specification of the kind of print defect which is perceptible to the user, that means the input by the user may include a classification of the print defect, e.g. fine bands in vertical or horizontal direction, low contrast stains, a colour deviation or something else.

Within the automated detection process at 13, the special test job printing 14, the scanning 15 of the test print job and the per-page analysis 16 can be repeated in a kind of iterative process as shown by the arrow line.

After the automated detection process 13, which is on a per-page basis, a global analysis 17 may be carried out which is based on the results of a number of test printouts.

After finishing the global analysis 17, a print quality defect source is identified and output to the user at 18, and the process, in the example of FIG. 2, comes to an end at 20.

In the example which is shown in FIG. 3, in which corresponding reference numerals indicate corresponding items as in FIG. 2, after the print quality defect source identification at 18 and appropriate measures by the user to fix or replace the malfunctioning component, at 19, the user will input whether the defect has been corrected or not. If the input is "Yes", the process comes to an end at 20, as is the case in the example of FIG. 1. However, if the input is "No", i.e. that the defect has not been corrected, the process is branched back to the decision at 12, where the user again is able to make an input which specifies the print defect which still, or which now in a different form, is perceptible to him. From 12, the above described automated detection process 13, and optionally the global analysis 17, start again. Thus, in a sort of iterative process in which the user is involved, the print quality defect source can be identified successively.

Some more general points of examples as described herein will be discussed:

Printer or press operators usually spend a significant part of their working time monitoring printed pages for quality deficiencies and remedying any that occur. Whenever a print defect is noticed, the press operator or user has to stop the press, detect the malfunctioning component, fix or replace the same, and regain print quality. Printing and print quality are an integral of many mechanical and chemical components, hence, quick resolutions depend highly on the operator's skills, experience and know-how. Indeed, records show that functional parts are often unnecessarily replaced, which significantly increases shutdown time and overall consumables and costs.

The malfunction diagnosis system as described here increases productivity and reduces consumables and manpower costs by assisting in identifying the cause of failure and it enables quick and accurate resolution of the problem even by an inexperienced operator.

One optional functionality of the printer with malfunction diagnosis system described is the integration of the subjective sensitivities of the user together with the objective machine state or condition to provide a fast, robust and deterministic resolution for print quality issues. This approach enables the skills and abilities of an inexperienced operator to be leveraged in order to diagnose and resolve print quality defects efficiently. Additionally, the system enables the root cause of a print quality defect to be separated even for cases with multiple sources and hence restricts the treatment to the source of the print quality defect alone, saving consumables and valuable time. So, the malfunction diagnosis system described may increase printer uptime and reduce operators' training time.

According to one example, the printer controller is further configured for correcting a print defect in an iterative process in which generating test print job image data, producing a corresponding test printout and receiving and analyzing the measurement data which are output from the sensing device as measured from the test printout are repeated. Such an iterative process may also include the repeated receipt of malfunction-related input by the user. Additionally, the printer controller may be configured for correcting the print defect in an iterative process which includes applying a correction to printer or printer operation at the input device by the user based on the output information indicative of a cause for the print defect.

The at least one sensing device may be an inline scanner or a spectrometer.

According to one example, the printer controller may be configured to analyze the measurement data output from the sensing device as measured on the test printout on a per-page basis.

According to another example, the printer controller may be configured to analyze the measurement data output from the sensing device as measured on the test printout on a global basis including a number of test printouts.

According to still another example, the printer controller may be configured to analyze the measurement data output from the sensing device as measured on the test printout on at least one of a per-page basis and on a global basis including a number of test printouts.

According to yet another example, the printer controller may be configured for correcting a print defect in an iterative process in which generating test print job data, producing a corresponding test printout, and receiving and analyzing measurement data which are output from the sensing device as measured from the test printout are repeated, and wherein the printer controller is configured to analyze the measurement data output from the sensing device as measured on the test printout on at least one of a per-page basis and on a global basis including a number of test printouts.

According to one example, the printer controller may be configured to generate the test print job image data in response to the user input specifying the perceptible print defect such that a class of one or more test print job image data is associated with a specific malfunction-related input by the user.

In this example, the test print job image data may be modified with regard to the specific malfunction-related input by the user with which the class of test print job image data is associated so that the analysis of the measurement data which are output from the sensing device as measured on the test printout is improved.

According to another example, the printer controller may be configured for correcting a print defect in an iterative process in which generating test print job image data, producing a corresponding test printout, and receiving and analyzing the measurement data output from the sensing device as measured from the test printout are repeated, and wherein the test print job image data are modified with regard to the specific malfunction-related input by the user with which the class of test print job image data is associated so that the analysis of the measurement data output from the sensing device as measured on the last printout is improved, and wherein the printer controller is configured to modify the test print job image data during the iterative process.

Another example includes a method of malfunction-diagnosis in a printer, wherein the printer comprises a printing unit arranged to produce a printout from image-representing data, an input device arranged to receive printer-operation-related input from a user, an output device arranged to provide printer-operation-related information for the user, a printer controller arranged to control operation of the printer in response to input commands by the user from the input device and to forward the image-representing data to the printing unit and to output the printer-operation-related information for the user at the output device, and at least one sensing device arranged to perform measurements on the printout produced by the printing unit and to output corresponding measurement data to the printer controller. The method of malfunction-diagnosis comprises to receive malfunction-related input by the user from the input device, which user input specifies a print defect perceptible to the user, to generate image data representing a test print job in response to the user input specifying the perceptible print defect, and to forward the test print job image data to the printing unit to produce a corresponding test printout, to receive and analyze the measurement data output from the sensing device as measured on the test printout, and to output information indicative of a cause for the print defect based on an analysis of the measurement data output from the sensing device.

According to one example, the method comprises correcting the print defect in an iterative process in which generating the image data representing the test print job, producing a corresponding test printout, and receiving and analyzing the measurement data output from the sensing device as measured from the test printout are repeated.

The method may comprise to analyze the measurement data output from the sensing device as measured on the test printout on at least one of a per-page basis and on a global basis including a number of test printouts.

For a number of cases of print quality defects, the described wizard-based expert system is able to provide a complete solution directly, but also in more complex cases of print quality defects where, due to the complexity of a printing process and the ambiguity of resolutions, a straight-on-forward resolution is not possible, a few simple steps may be sufficient to capture the subjective sensitivity of the print quality defect. Also in such cases the automatically continuing procedure is able to identify the objective machine state or condition or to pinpoint one or more specific malfunction components. Thus, the system enables the root cause of a print quality defect to be separated even for cases with multiple sources and hence restricts the treatment to the source of the print quality defect alone, saving consumables and value time. As a result, the system increases press uptime and reduces operators' training time.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed:

1. A printer with a malfunction-diagnosis system, the printer comprising a printing unit arranged to produce a printout from image-representing data, an input device arranged to receive printer-operation-related input from a user, an output device arranged to provide printer-operation-related information for the user, a printer controller arranged to control operation of the printer in response to input commands by the user from the input device and to forward the image-representing data to the printing unit and to output the printer-operation-related information for the user at the output device, and at least one sensing device arranged to perform measurements on the printout produced by the printing unit and to output corresponding measurement data to the printer controller, wherein the printer controller further is configured to initialize a malfunction diagnosis by receiving an indication of a user perceived print quality defect from the input device, generate image data representing a test print job in response to the received indication of the user perceived print quality defect, and to forward the test print job image data to the printing unit to produce a corresponding test printout, receive and analyze the measurement data output from the sensing device as measured on the test printout, and output information indicative of a cause for the print defect based on an analysis of the measurement data output from the sensing device.

2. The printer of claim 1, wherein the printer controller further is configured for correcting the print defect in an iterative process in which generating the image data representing the test print job, producing a corresponding test printout, and receiving and analyzing the measurement data output from the sensing device as measured from the test printout are repeated.

3. The printer of claim 2, wherein the printer controller is configured for correcting the print defect in an iterative process, which includes applying a correction either to printer or printer operation on the input device, by the user, based on the output information indicative of a cause for the print defect.

4. The printer of claim 1, wherein the sensing device is an inline scanner.

5. The printer of claim 1, wherein the sensing device is a spectrometer.

6. The printer of claim 1, wherein the printer controller is configured to analyze the measurement data output from the sensing device as measured on the test printout on at least one of a per-page basis and on a global basis including a number of test printouts.

7. The printer of claim 2, wherein the printer controller is configured to analyze the measurement data output from the sensing device as measured on the test printout on a per-page basis, and on a global basis including a number of test printouts.

8. The printer of claim 3, wherein the printer controller is configured to analyze the measurement data output from the sensing device as measured on the test printout on a per-page basis.

9. The printer of claim 8, wherein the printer controller further is configured to analyze the measurement data output from the sensing device as measured on the test printout on a global basis including a number of test printouts.

10. The printer of claim 1, wherein the printer controller is configured to generate the test print job image data in response to the user input, specifying the perceptible print defect, such that a class of one or more test print job image data is associated with a specific malfunction-related input by the user.

11. The printer of claim 10, wherein the test print job data are modified with regard to the specific malfunction-related input by the user, with which the class of test print job image data is associated, so that the analysis of the measurement data output from the sensing device as measured on the test printout is improved.

12. The printer of claim 2, wherein the test print job data are modified with regard to the specific malfunction-related input by the user with which the class of test print job image data is associated so that the analysis of the measurement data output from the sensing device as measured on the test printout is improved, and wherein the printer controller is configured to modify the test print job representing image data during the iterative process.

13. A method of malfunction-diagnosis in a printer comprising a printing unit arranged to produce a printout from image-representing data, a user input device arranged to receive printer-operation-related input from a user, an output device arranged to provide printer-operation-related information for the user, a printer controller arranged to control operation of the printer in response to input commands by the user from the input device and to forward the image-representing data to the printing unit and to output the printer-operation-related information for the user at the output device, and at least one sensing device arranged to perform measurements on the printout produced by the printing unit and to output corresponding measurement data to the printer controller, wherein the method comprises initializing a malfunction diagnosis by receiving, from a user via the user input device, an indication of a user perceived print quality defect and a classification of the user perceived print quality defect, generating, by the printer controller, image data representing a test print job in response to the received indication of the user perceived print quality defect, and forwarding the test print job image data to the printing unit to produce a corresponding test printout, receiving and analyzing, by the printer controller, the measurement data output from the sensing device as measured on the test printout, and outputting information indicative of a cause for the print defect based on an analysis of the measurement data output from the sensing device.

14. The method of claim 13, comprising correcting the print defect in an iterative process in which generating the image data representing the test print job, producing a corresponding test printout, and receiving and analyzing the measurement data output from the sensing device as measured from the test printout are repeated.

15. The printer of claim 10, in which the class is identified by a user.

16. The method of claim 13, further comprising classifying the print defect according to sensitivities of the user.

17. The method of claim 16, further comprising guiding the user in classifying the print defect.

18. The method of claim 13, further comprising correcting the print defect in an iterative process, which includes applying a correction either to printer or printer operation on the input device, by the user, based on the output information indicative of a cause for the print defect.

19. The method of claim 18, further comprising determining from a user, whether the print defect has been corrected.

20. A method of malfunction-diagnosis in a printer comprising initializing a malfunction diagnosis by receiving, from a user via a user input device, an indication of a user perceived print quality defect, guiding the user in classifying the user perceived print quality defect, receiving from a user input device, a classification of the user perceived print quality defect, generating, by the printer controller, image data representing a dedicated test print job in response to the received indication of the user perceived print quality defect and the received classification of the user perceived print quality defect, and forwarding the test print job image data to the printing unit to produce a corresponding test printout, receiving and analyzing, by the printer controller, the measurement data output from the sensing device as measured on the test printout, outputting information indicative of a cause for the print defect based on an analysis of the measurement data output from the sensing device, and receiving an indication that the user perceived print quality defect has been corrected.

* * * * *